Jan. 12, 1971  D. W. CRAFT  3,554,809
PROCESS AND APPARATUS FOR DISTRIBUTING FLUID INERTS
WITH RESPECT TO THE ELECTRODES OF A FUEL BATTERY
Filed Dec. 18, 1967 2 Sheets-Sheet 1

INVENTOR:
DONALD W. CRAFT,

BY *Nathan Lowry*
HIS ATTORNEY.

Jan. 12, 1971            D. W. CRAFT            3,554,809
PROCESS AND APPARATUS FOR DISTRIBUTING FLUID INERTS
WITH RESPECT TO THE ELECTRODES OF A FUEL BATTERY
Filed Dec. 18, 1967            2 Sheets-Sheet 2

INVENTOR:
DONALD W. CRAFT,

BY
HIS ATTORNEY.

United States Patent Office 3,554,809
Patented Jan. 12, 1971

3,554,809
PROCESS AND APPARATUS FOR DISTRIBUTING FLUID INERTS WITH RESPECT TO THE ELECTRODES OF A FUEL BATTERY
Donald W. Craft, Melrose, Mass., assignor to General Electric Company, a corporation of New York
Filed Dec. 18, 1967, Ser. No. 691,300
Int. Cl. H01m 27/16
U.S. Cl. 136—86                                11 Claims

ABSTRACT OF THE DISCLOSURE

A fuel battery is provided having an electrolyte element, such as a matrix immobilized electrolyte or ion exchange structure, carrying first and second segmented electrodes on opposite faces. The electrode segments are electrically serially related. Fluid reactant is distributed to the first electrode segments through one or more channels which direct the fluid reactant to flow serially across the electrode segments along laterally spaced interconnected courses which are free of interconnection mediate their ends. This causes fluid inerts present in the fluid reactant to be collected in the terminal courses so that the fluid inerts are distributed between the electrode segments.

---

My invention pertains to a process of distributing fluid inerts with respect to the electrodes of a fuel battery and to an improved fuel battery construction.

My invention is an improvement on the invention of Holmes, Ser. No. 563,501, filed July 7, 1966, titled "Moisture Conserving Convectively Fed Fuel Cell Unit." Holmes discloses a fuel battery provided with a central mounting frame which mounts two ion exchange membranes. The inner and outer faces of the membranes carry laterally spaced electrode segments. These segments are electrically connected in series. The ion exchange membranes and the mounting frame sealingly cooperate to form a chamber into which air is allowed to convectively flow at a controlled rate. A fluid reactant, such as hydrogen, is distributed to the electrode segments lying on the outer faces of the ion exchange membranes. Also, heat is dissipated from the fuel battery outwardly. To accomplish this a fluid reactant distributor is mounted adjacent the outer face of each of the ion exchange membranes. The fluid distributor in the preferred form is a metal frame carrying on its outer surface vertical heat dissipation fins. To provide intimate contact between the metal frame and the outer electrode segments a plurality of platens are provided which press against the outer surface of the electrode segments. The platens are defined by two intersecting sets of parallel channels in the metal plate. The fluid reactant is then free to flow to the outer electrode segments through a number of multi-ply interconnected channels. Since the electrodes are porous and generally include as an outer layer foraminous elements, such as screens, the reactant is free to diffuse from the channels to the portions of the electrode segments which bear against the platens. Electrical shorting of adjacent electrode segments through the platens is prevented by a thin, thermally conductive, electrically insulative coating on the platens. The mounting of segmented electrodes on a unitary electrolyte structure is also discussed in detail by Dantowitz in patent application Ser. No. 529,578, filed Feb. 23, 1966, now abandoned for Ser. No. 806,015, also abandoned, while the thermally conductive relationship of the platens to the electrodes is discussed in detail by Harrison et al. in Ser. No. 304,910, filed Aug. 27, 1963, now Pat. No. 3,392,058. The disclosures of the Holmes, Dantowitz, and Harrison et al. patent applications are incorporated by reference in this patent application.

My invention is directed to a discovery which avoids a disadvantage associated with the fuel battery disclosed by Holmes. When the Holmes fuel battery is operated on a fuel reactant, such as hydrogen, which contains small quantities of impurities, the impurities collect in the channels of the fluid distributor and periodic purging is required, as is discussed in the Holmes patent application. Even if totally pure hydrogen could be obtained some substantial quantities of inerts would still eventually build up within the fluid distributor channels as a result of nitrogen diffusion through the ion exchange membranes.

It is my recognition that inert fluids tend to collect in the multi-ply interconnected channels of the Holmes fuel battery construction to mask from the fluid reactant the electrode segment next adjacent the purge outlet while the other electrode segments remain relatively free of fluid inerts. As inerts accumulate over the surface of the masked electrode, the fuel cell formed by this electrode segment and the electrode segment mounted in directly opposed relation and in contact with air will be polarized. Polarization may even proceed to the point at which this cell is being electrically driven by the remaining cells of the battery. In this instance it is possible for electrolysis to occur which generates hydrogen at the electrode segment in contact with ambient air and oxygen at the electrode segment in contact with the inert fluid. The generation of oxygen in the hydrogen containing channels causes burning on the hydrogen exposed electrode segments and total failure of the fuel battery as a power source follows soon thereafter.

It is an object of my invention to provide a process and apparatus which better distributes inert fluids between the electrode segments of a fuel battery so that one cell of the battery is not selectively polarized to the extent that electrolysis may occur.

This and other objects of my invention are, in one aspect accomplished by providing a fuel battery including electrolyte means including laterally spaced segments in contact with a first major face. Second electrode means including laterally spaced segments in contact with the second major face of the electrolyte means are mounted in opposition to the segments of the first electrode means. At least a portion of the segments are electrically connected in series, and means are provided for delivering a fluid reactant to the first electrode means including an inlet means. My improvement resides in the delivering means including a portion cooperating with the electrolyte means and the first electrode means to define a distribution channel for the fluid reactant. The distribution channel includes a first course extending from the fluid inlet means across one of the segments to a remaining segment electrically connected to lie at a differing electrical potential and a second course extending from the remaining segment back to the one segment. The first and second courses are interconnected remote from the one segment only.

In another aspect my invention is directed to a process of generating electrical energy comprising providing an electrolyte element with a plurality of laterally spaced first electrode segments on one major face and a plurality of directly opposed second electrode segments on a second major face thereof. The segments are electrically connected in series. A first fluid reactant is permitted to contact the first electrode segments and a second fluid reactant is permitted to contact the second electrode segments. The first fluid reactant is directed from an inlet sequentially back and forth across the first electrode segments through a plurality of serial related laterally spaced courses leading to an outlet from which fluid flow is normally restricted. The electrode means are connected to an electrical load so that the first fluid reactant is consumed at the first electrode segments and the second fluid reactant is consumed at the second electrode segments. An inert fluid entrained in the first fluid reactant is collected in the courses leading to the outlet so that the inert fluid is distributed between the first fluid electrode segments.

My invention may be better understood by reference to the following detailed description considered in conjunction with the drawings, in which.

Figure 1:
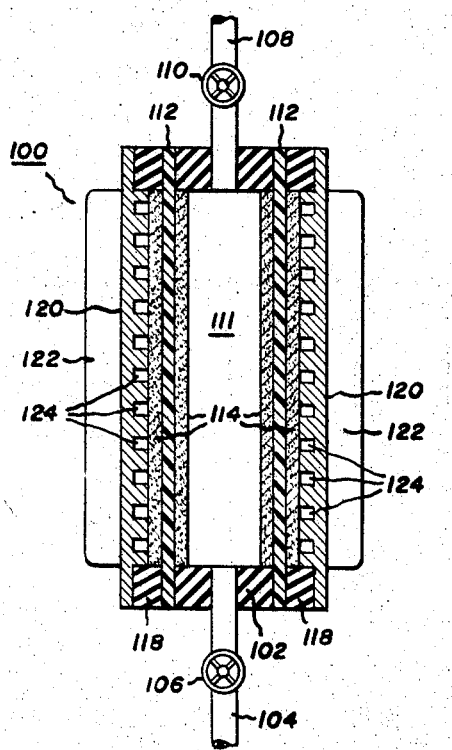
FIG. 1 is a vertical section of a fuel battery according to my invention, with portions being schematically indicated.

Noting first FIG. 1, a fuel battery 100 is shown having a central mounting frame 102 formed of electrically insulative material. Ion exchange membranes 112 sealingly cooperate with the outer surfaces of the frame to form a chamber 111. A fluid reactant inlet conduit 104 is shown communicating with the chamber and controlled by a valve 106. A fluid reactant outlet conduit 108 also communicates with the chamber and is controlled by a valve 110.

Figure 3:
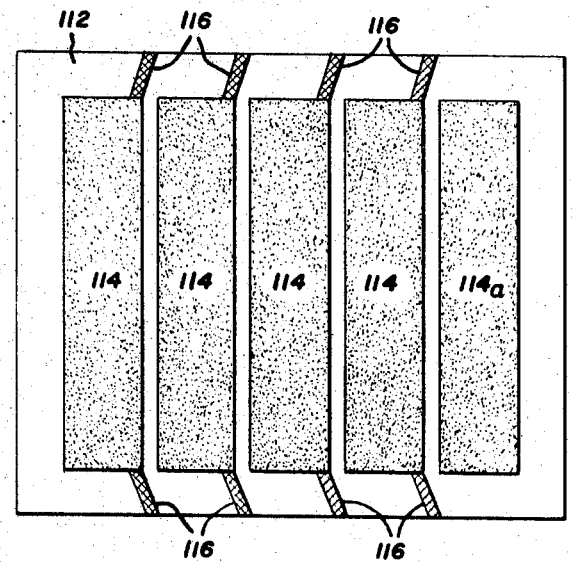
FIG. 3 is an elevation of an electrolyte structure with electrode segments mounted thereon.

Each ion exchange membrane has mounted thereon a plurality of electrode segments 114. As shown in FIG. 3 the electrode segments are mounted by the ion exchange membrane in laterally spaced relation. FIG. 3 may be taken as showing either an inner or outer face of the membrane with the electrodes attached, since both are identical in appearance. The electrode segments on the inner face of each membrane are mounted in direct opposition to the electrode segments on the outer face of each membrane. Edge connecting strips 116 extend from one electrode segment around the edge of the membrane to the electrode segment on the opposite face of the membrane one position removed. In this way the segments are electrically connected in series. An electrical potential develops between each electrode segment and the segment mounted on opposition thereto equivalent to that developed by a single fuel cell. Accordingly, in the form illustrated each ion exchange membrane with the electrode segments mounted thereon develops the potential difference of five fuel cells. The electrode segment 114a lying on each face of each ion exchange membrane is not connected to the remaining segments by strips 116, but may be connected by electrical leads, not shown, to terminals or to provide any other type of electrical interconnection desired. Holmes, for example, connects the electrode segments carried by four ion exchange membranes in series and connects one electrode segment of each of two membranes to a terminal of the fuel battery. This particular structural feature of the fuel battery is not per se the subject matter of my invention and is more fully described in the applications of Dantowitz and Holmes.

Figure 2:
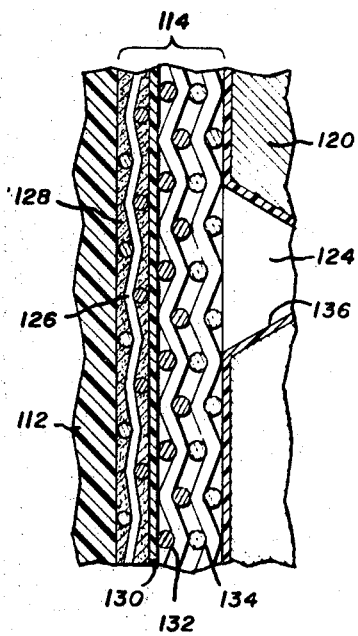
FIG. 2 is a sectional detail of the fuel battery shown in FIG. 1.

Peripheral gaskets 118 seal between the outer edge of the membranes and fluid distributors 120. The distributors may be provided with heat transfer fins 122 on their outer surface. A channel 124 is provided in the inner face of each distributor. The preferred relationship of the distributor to the electrode segments is best illustrated in FIG. 2. The ion exchange membrane is shown with the electrode segment 114 mounted in contact therewith. In a preferred form illustrated the electrode segment includes a current collector screen embedded in an electrocatalytically active mass 128. A hydrophobic, gas permeable film 130 overlies the electrocatalytically active mass. Two screens 132 and 134, preferably formed of dissimilar mesh size or having their axes skewed, overlie the hydrophobic film. The inner surface of the distributor is provided with a thin, thermally conductive, electrically insulative film 136.

Figure 4:
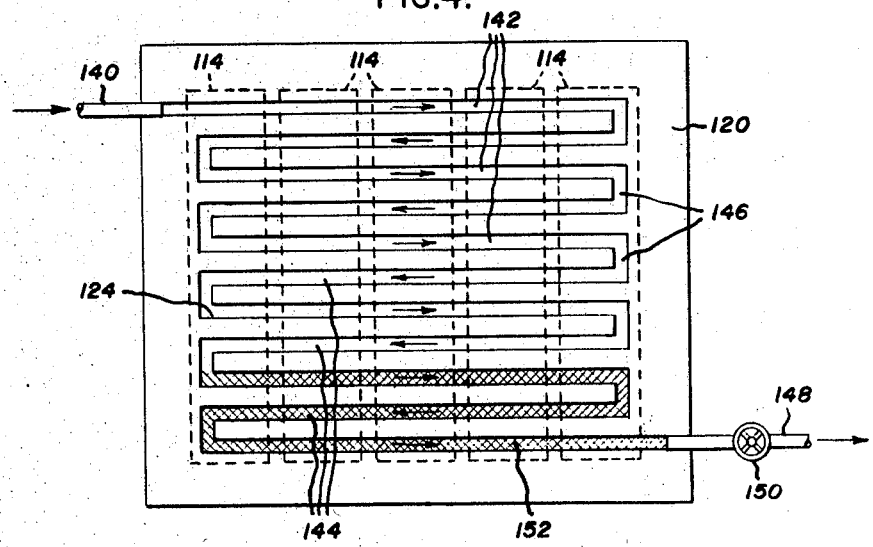
FIG. 4 is an elevation showing the inner face of a distributor according to my invention.

The layout of the channels in the inner faces of the distributors is best appreciated by reference to FIG. 4. In order to illustrate the relationship between the channels and the electrode segments 114, the position of the segments is indicated by dashed lines. Inlet conduit means 140 is sealingly associated with the distributor channel at its one terminus. The channel 124 may be considered to be made up of a plurality of serially interconnected courses. In one set of courses indicated by reference numeral 142 the fluid reactant is directed in sequence from the electrode segment at the left of the distributor, as shown in FIG. 4, to the right-hand electrode segment. In a second set of courses designated by reference numerals 144 the fluid reactant moves from the right-hand electrode segment across the intervening segments to the left-hand electrode segment. The first and second courses are connected end to end as indicated by reference numeral 146. The course 142 most remote from the inlet conduit means 140 is connected to an outlet conduit means 148 schematically illustrated as being controlled by a valve means 150. The channels next adjacent the outlet conduit means are shown by cross-hatching to contain an inert fluid.

In generating electrical energy the electrode segments may be electrically connected in series, ambient air admitted to the chamber 114 through the inlet conduit 104 and exhausted through outlet conduit 108, and a fluid reactant such as hydrogen admitted to the channels of the distributors through inlet conduit means 140. To generate electricity the fuel battery electrode segments are connected across an electrical load in a manner well understood by those skilled in the art. Where ambient air is the oxidant it may be allowed to convectively circulate into contact with the inner electrode segments.

Hydrogen leaving the inlet conduit means enters the channels 124 and, specifically, the course 142 thereof. The hydrogen is then transported sequentially from the electrode segment next adjacent the inlet conduit means to the electrode segment most remote from the fluid inlet means. The hydrogen then enters the second course 144 of the channel by reason of the interconnection therebetween at 146 and is transported back from the remote electrode segment to the electrode segment next adjacent the fluid inlet means. In this way the hydrogen flows back and forth sequentially across the electrode segments. It is noted that adjacent the intermediately located electrode segments the courses of the channels are free of interconnection so that the hydrogen must flow longitudinally of the courses.

It is recognized that the hydrogen is not entirely confined to the channels. The channels may be looked upon as a primary fluid reactant distribution system. Fluid reactant is free to contact the electrode segments laterally of the courses by diffusion through the interstices of the screens 132 and 134. As the fluid reactant traverses the courses it is being concurrently laterally diffused into contact with the electrode segments where it is consumed electrochemically at a rate proportional the electrical current being drawn from the fuel battery. Accordingly, while the fluid reactant which emerges from the inlet conduit means may contain only a small concentration of inert fluid ingredients, this proportion is much higher in the fluid that reaches the courses next adjacent the outlet conduit means. If the valve means 150 is initially closed or adjusted so as to significantly restrict the rate at which fluid may emerge from the distributor, inerts will collect in the courses next adjacent thereto.

It is a significant feature of my invention that the fluid inerts are spread in near uniform manner among the several electrode segments. This means that all of the electrode segments are polarized to about the same degree by the fluid inerts and that no one electrode segment is failing to carry its share of the electrical load. Also, the chance of one cell of the battery becoming so highly polarized as to be driven into electrolysis by the remaining cells is minimized. Another significant advantage provided by my series connected courses is that every portion of the channel is positively purged during start up and at purging intervals thereafter. With conventional, multi-ply interconnected channels occluded portions of the channels tend to be by-passed rather than purged. This may be appreciated in considering the operation of my fuel battery if water should be condensed at any point to block or partially block one or more of the courses, as might readily occur by generalized or local cooling of the fuel battery or some portion thereof. The water would be moved through the courses by the fluid reactant and laterally distributed over the surface of the ion exchange membrane where it may be readsorbed. With a conventional grid pattern of channels any water condensed in the channels is simply by-passed by the fluid reactant and a portion of the electrode segments is accordingly more or less permanently deactivated.

Figure 5:
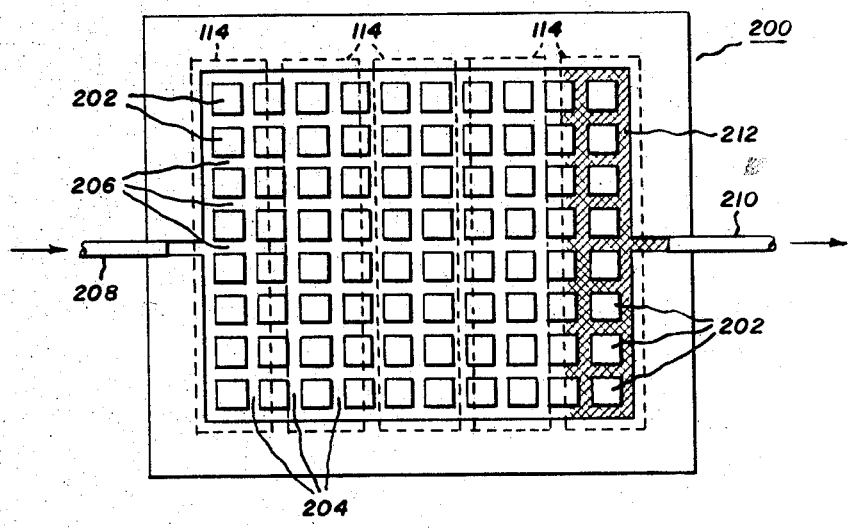
FIG. 5 is an elevation showing the inner face of a conventional distributor.

The advantage of my invention as regards distribution of inert fluids is best appreciated by reference to FIG. 5. The distributor 200 may be physically substituted for a distributor 120 in the fuel battery 100. The distributor 200 is provided with a plurality of platens 202 which are defined by intersecting sets of vertical channels 204 and horizontal channels 206. The fluid reactant upon leaving the fluid inlet means 208 and traversing the channels to the fluid outlet means 210 is then free to flow through a large number of parallel and multi-ply interconnected courses. The result is as indicated by cross hatching 212. The fluid inerts then to accumulate almost exclusively adjacent the electrode segment 114 most remote from the fluid inlet conduit means. Thus, the improvement attributable to my distinctive fluid reactant circulation pattern is readily appreciated.

Figure 6:
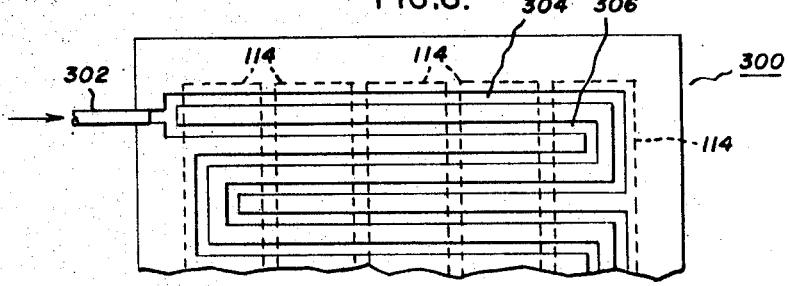
FIG. 6 is a fragmentary elevation of an inner face of a modified distributor according to my invention.

FIG. 6 is a fragmentary view of a modified distributor 300 formed according to my invention. The fluid inlet means 302 is connected to two parallel channels 304 and 306 which are otherwise similar to the channel 124. The two channels are free of interconnection between the inlet and the outlet conduit means. This modification illustrates that it is not essential in order to obtain the advantages of my invention to entirely confine the fluid reactant to serially related channels. A combination of serially related and parallel channels may, if properly chosen in accordance with my teachings, serve equally as well.

While I have disclosed my invention with reference to certain preferred embodiments and uses, it is appreciated that various modifications of structure and usage will readily occur to those skilled in the art. It is considered undesirable to attempt to catalogue all possible obvious variations in construction and use. For purposes of illustration only, it is noted that while the electrolyte elements have been described as ion exchange membranes, it is possible to substitute a porous matrix containing an immobilized electrolyte. It is not necessary that the electrolyte element be either planar or rectangular as shown, but circular and cylindrical constructions could be readily devised without the exercise of invention. The fuel battery 100 is shown provided with two ion exchange membranes, but could be readily modified so as to incorporate one, three, or any number of ion exchange membranes. It is not essential that all of the electrode segments be electrically connected in series. Series-parallel combinations of interconnection may be desirable as well. The use of screen or any other foraminous lateral distributor elements are not essential. Most fluid electrodes are sufficiently porous as to allow some lateral diffusion of fluid reactant from the channels. The foraminous elements allowing lateral diffusion are preferably coextensive with the area defined by the gaskets 118, but may be coextensive with the individual electrode segments, if desired. The foraminous lateral distributor elements may be electrically conductive or non-conductive, but are most preferably thermally conductive in most applications. If the foraminous elements are formed of non-conductive materials, the thin film 136 may be omitted. The heat transfer fins are not essential. In a variant form means may be provided to circulate a coolant adjacent the outer surface of the distributors. While ambient air has been disclosed as a preferred oxidant, pure oxygen, hydrogen peroxide, or any other conventional oxidant may be substituted. In place of hydrogen, ammonia, reformate, or hydrocarbons may be substituted, as is well understood in the art. The fluid reactant which is the oxidant may be fed to the distributors and the fluid reactant which is the fuel may be fed to the chamber 114, if desired. Still other variations may be undertaken. It is accordingly intended that the scope of my invention be determined with reference to the following claims:

What I claim and desire to secure by Letters Patent of the United States is:

1. In a fuel battery comprising a plurality of fuel cells including
    electrolyte means having first and second major faces,
    first electrode means including a plurality of laterally spaced segments in contact with first said first major face,
    second electrode means including a corresponding plurality of laterally spaced segments in contact with said second major face, each segment of said second electrode means being mounted in opposition to one segment of said first electrode means,
    at least a portion of said segments being electrically connected in series, and
    means for delivering a fluid reactive to said first electrode means including an inlet means,
    the improvement comprising
    fluid reactant delivering means for delivering reactant to all of the cells and ensuring that reactants are evenly distributed among all cells including a portion cooperating work said electrolyte means and said first electrode means to define a distribution channel for the fluid reactant including a first course extending from said fluid inlet means transversely across one of said segments to a remaining segment electrically connected to lie at a different electrical potential and across said remaining segment and a second course extending from and across said remaining segment back to and across said one segment, said first and second courses being interconnected at the end remote from said one segment only whereby said fluid reactant passes back and forth across said segments a number of times so that fluid inerts are evenly distributed among all of the cells making up said battery.

2. A fuel battery according to claim 1 in which said electrolyte means is comprised of a porous matrix having an electrolyte immobilized therein.

3. A fuel battery according to claim 1 in which said electrolyte means is comprised of an ion exchange structure.

4. A fuel battery according to claim 3 in which said electrolyte means is an ion exchange membrane.

5. A fuel battery according to claim 1 in which comprised of a multiplicity of courses extending over each of said first electrode segments, said courses being serially interconnected, whereby fluid reactant is serially and repeatedly directed across said electrode segments in being distributed by said channel.

6. A fuel battery according to claim 1 in which said delivering means portion cooperating with said electrolyte means and said first electrode means is thermally conductive and electrically insulative.

7. A fuel battery according to claim 6 in which said delivering means includes means for dissipating heat generated by said fuel battery.

8. A fuel battery according to claim 1 in which said first electrode means segments include means permitting diffusion of a portion of the fluid reactant laterally of said courses.

9. A fuel battery comprising
a central mounting frame,
a plurality of ion exchange membranes each having an inner face sealingly cooperating with said mounting frame to define a chamber for a first fluid reactant and an outer face in opposed relation thereto,
means for controlling entry of the first fluid reactant into the chamber,
inner electrode means including laterally spaced segments in contact with the inner faces of said ion exchange membranes,
outer electrode means including laterally spaced segments in contact with the outer faces of said ion exchange membranes,
each segment of said inner electrode means being mounted in opposition to one segment of said outer electrode means,
said inner and outer segments being electrically connected in series,
thermally conductive foraminous means for allowing lateral diffusion of a second fluid reactant overlying said outer electrode means,
a thermally conductive distributor overlying said outer electrode means associated with each of said ion exchange membranes,
a major portion of said distributors lying in thermally conductive relation with said foraminous means,
said distributors each being provided with at least one fluid distribution channel,
said one channel being comprised of first and second interleaved sets of courses,
said first set of courses being provided with inlet portions adjacent one of said outer electrode segments and outlet portions adjacent a remaining of said outer electrode segments,
said second set of courses serially interconnecting said courses of said first set by interconnecting said inlet and outlet portions, and
said first and second set of courses being laterally spaced and free of interconnection mediate said inlet and outlet portions.

10. A process of generating electrical energy comprising
providing an electrolyte element with a plurality of laterally spaced first electrode segments on one major face and a plurality of directly opposed second electrode segments on a second major face thereof,
connecting the segments electrically in series,
permitting a first fluid reactant to contact the first electrode segments and a second fluid reactant to contact the second electrode segments,
directing the first fluid reactant from an inlet sequentially back and forth across the first electrode segments through a plurality of serially related laterally spaced courses leading to an outlet,
normally restricting fluid flow from the outlet,
connecting the electrode means across an electrical load,
consuming the first fluid reactant at the first electrode segments and the second fluid reactant at the second electrode segments, and
collecting an inert fluid entrained in the first fluid reactant in the courses leading to the outlet so that the inert fluid is distributed between the first fluid electrode segments.

11. A process according to claim 10 additionally including the step of periodically purging the courses of collected inert fluid.

References Cited

UNITED STATES PATENTS

| 3,134,697 | 5/1964 | Niediach | 136—86 |
| 3,146,131 | 8/1964 | Linden et al. | 136—86 |
| 3,356,535 | 12/1967 | Drushella | 136—86 |
| 3,432,353 | 3/1969 | Von Krusenstierna et al. | 136—86 |
| 3,436,272 | 4/1969 | Gelting | 136—86 |

FOREIGN PATENTS

| 1,452,564 | 10/1966 | France | 136—86 |

ALLEN B. CURTIS, Primary Examiner